L. GSCHWIND.
DISH WASHING APPARATUS.
APPLICATION FILED JUNE 26, 1913.

1,135,108.

Patented Apr. 13, 1915.

Leon Gschwind,
Inventor

Witnesses:

By
Attorney

UNITED STATES PATENT OFFICE.

LEON GSCHWIND, OF YOUNGSTOWN, OHIO.

DISH-WASHING APPARATUS.

1,135,108.      Specification of Letters Patent.      Patented Apr. 13, 1915.

Application filed June 26, 1913. Serial No. 775,863.

*To all whom it may concern:*

Be it known that I, LEON GSCHWIND, a citizen of the United States, residing at Youngstown, in the county of Mahoning and State of Ohio, have invented certain new and useful Improvements in Dish-Washing Apparatus, of which the following is a specification.

My invention relates to improvements in dish washing apparatus, and one object is the provision of an apparatus which will be used in connection with and form a part of the sink structure and thus be capable of service in washing dishes and permit the sink to be used for its usual functions.

Another object of my invention is the provision of a dish washing apparatus which will be practically covered and out of sight producing a compact structure which will not disfigure the appearance of the sink or interfere with its use.

Another object of my invention is the production of a dish washing apparatus which will be capable of instant access when desired, which can be operated by hand or power as may be desired, and which will thoroughly subject the dishes to the action of the water to insure a perfect cleaning.

Another object of my invention is the provision of an apparatus which will be combined with and form a part of the sink, which will permit of the use of hot or cold water from the usual service pipe, which will permit of the use of the dish washing means or the sink, which will be thoroughly efficient and practical from every point of view, and which will be strong and durable and inexpensive of production.

With these objects in view my invention consists in the combination with a sink having an auxiliary chamber or compartment in communication with the sink of dish washing means arranged in said chamber and provided with operating means.

The invention further consists of a dish washing apparatus embodying novel features of construction and combination of parts substantially as disclosed herein.

Figure 1:
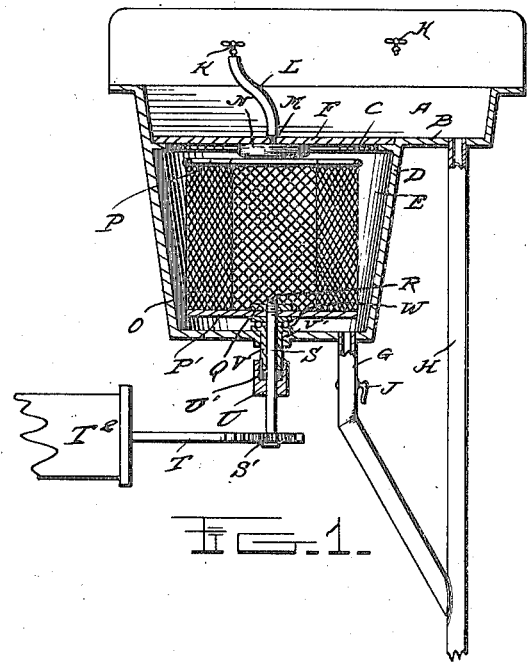
Figure 2:
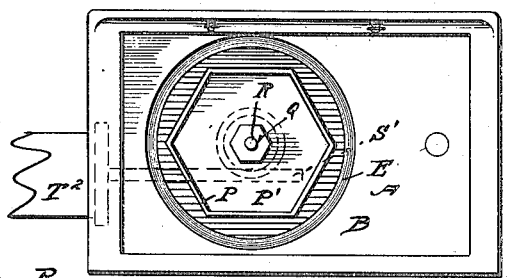
Figure 3:
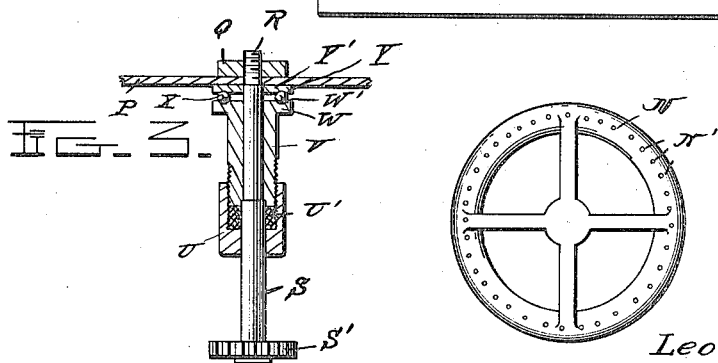
Figure 4:
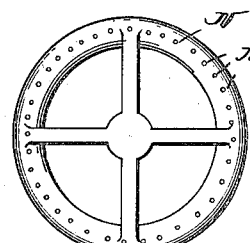

Figure 1 is a view partly in section and front elevation of a sink and dish washing means constructed in accordance with and embodying my invention. Fig. 2 is a top plan view of the sink with cover of its auxiliary chamber removed to show the dish washing means in said chamber. Fig. 3 is a sectional view on an enlarged scale of the mounting and operating shaft of the dish washing mechanism, and Fig. 4 is a plan view from the bottom of the water spraying or distributing device used in my dish washing apparatus.

Referring by letter to the drawings, in which similar letters of reference are used to designate corresponding parts in all the views: the letter A, designates the sink of the usual or any desired shape and size, having in its bottom wall B, an opening C, and depending from said opening and communicating therewith is the portion D, which forms an auxiliary chamber or compartment E, in which is located the dish washing mechanism, the chamber being covered and protected by the lid or cover F, and the chamber being provided with the discharge pipe G, leading to the usual discharge pipe H, of the sink, and the discharge pipe G, being provided with a valve or cut off J.

The usual cocks or spigots for hot and cold water designated as K, are provided and with either of said spigots is adapted to be connected the hose or pipe L, which leads to the nipple M, on the sprinkler or water distributing ring or head N, provided on its under side with openings N', for discharging the water and from this construction it will be understood that the water from the spigot discharges into the sprinkler or distributer and is distributed into the chamber of the sink.

The dishwashing mechanism is mounted in the chamber of the sink directly under the sprinkler and consists of the basket or cage composed of the wire netting or fabric portion O, having the securing band or border P, at its top and having the plate P', forming its bottom, and secured to the bottom by means of the clamping nut Q, which engage the upper threaded end R, is the driving shaft S, having at its lower end a gear pinion S', which meshes with the rack T, on the piston rod, of the motor $T^2$. From this construction it will be observed that the water is supplied and distributed into the cage or basket in which is placed the dishes, and that the cage or basket is given by means of the motor a rotary motion, which with the sprinkler subjects the dishes to a thorough action of the water to insure a perfect cleansing, and to cause the shaft to run smoothly and also to make a water tight joint, I provide the screw cap U, which receives a packing U', and in said screw cap is received the sleeve V, which fits in an opening V', in the bottom of the chamber and is formed with a flange W, having a ball track W', to receive the balls X, which balls are also retained in place in a ball track Y, of an upper plate Y', this construction forming the mounting for the operating shaft and being most clearly shown in Fig. 3.

From the foregoing description, taken in connection with the drawings it will be apparent that I provide a dish washing mechanism which will effect the washing in a rapid and thorough manner, which can be operated either by hand or power, which will have a great capacity, which will add little to the cost of the usual sink and will not detract from its usual appearance or increase the size or space occupied by the sink, which can be produced at a low price, be instantly ready for use, and which in every particular will be efficient and practical.

I claim:

In a dish washing apparatus, the combination with a sink having a discharge pipe and an auxiliary chamber of reduced size depending from said sink and having a discharge pipe leading to the discharge pipe of the sink, of a washing mechanism arranged in said auxiliary chamber and having a journal bearing in the bottom wall of said chamber.

In testimony whereof I affix my signature in presence of two witnesses.

LEON GSCHWIND.

Witnesses:
R. A. BEARD,
ANNA FLANNERY.